United States Patent
Sunderland

[11] 3,795,918
[45] Mar. 5, 1974

[54] ELECTRONIC RATIO INSTRUMENT FOR REMOTE TEMPERATURE MEASUREMENT

[75] Inventor: John C. Sunderland, New York, N.Y.

[73] Assignee: Capintec, Inc., Mount Vernon, N.Y.

[22] Filed: Jan. 31, 1972

[21] Appl. No.: 222,242

[52] U.S. Cl............. 356/45, 73/355 R, 324/140 D, 356/88, 356/96
[51] Int. Cl............................ G01j 5/60, G01j 3/42
[58] Field of Search ..... 73/355 R; 250/208; 356/45, 356/88, 93, 96, 97

[56] References Cited
UNITED STATES PATENTS

| | | |
|---|---|---|
| 3,619,059 | 11/1971 | Muller et al. .......................... 356/45 |
| 3,522,739 | 8/1970 | Coor et al. ............................ 356/97 |
| 3,513,313 | 5/1970 | Schwartz ........................... 73/355 R |
| 3,398,281 | 8/1968 | Treharne et al. .................. 73/355 R |

Primary Examiner—Ronald L. Wibert
Assistant Examiner—V. P. McGraw
Attorney, Agent, or Firm—Fleit, Gipple & Jacobson

[57] ABSTRACT

An all electronic instrument for non-contact temperature measurement independent of target emissivity based on measuring the ratio of light energy in two adjacent spectral bands by means of a reference light cell and a measurement light cell switchably connected to a common amplifier chain provided with electronic gain control servoed by the resultant output of the reference light cell.

2 Claims, 1 Drawing Figure

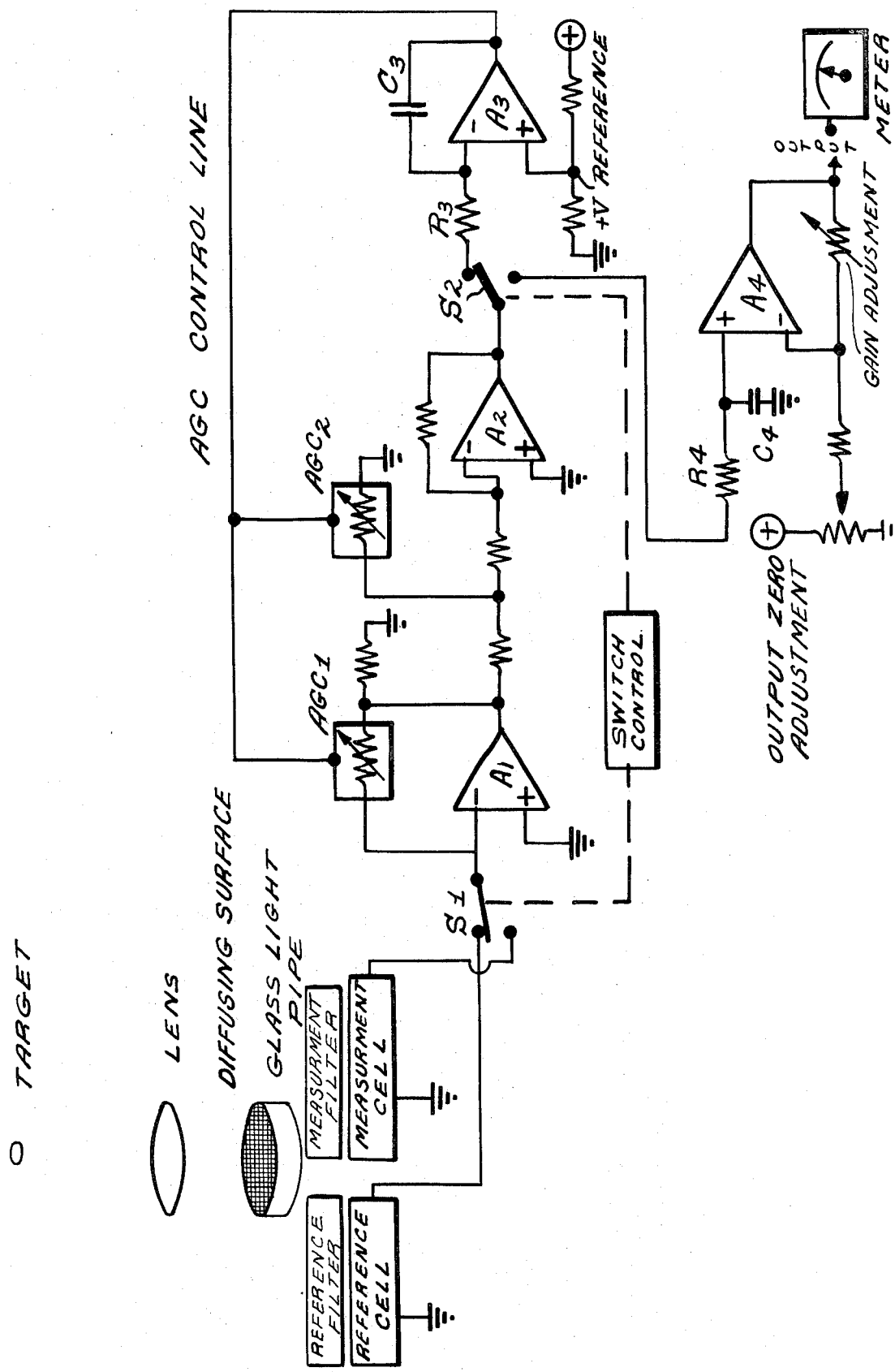

ELECTRONIC RATIO INSTRUMENT FOR REMOTE TEMPERATURE MEASUREMENT

BACKGROUND OF THE INVENTION

Prior art non-contact instruments for measuring and controlling temperature have utilized diaphragms and/or optical gain control to achieve accuracy; however, because of the mechanical operation involved, instruments heretofor have not been as rugged, reliable, and inexpensive as desired. The speed of response of the mechanical components is also undesirably long.

SUMMARY OF THE INVENTION

Temperature is measured using the ratio of power emitted by the target in two adjacent spectral bands. Only the inequality of the target's emissivity at the two wave lengths employed can affect the measurement. The power ratio is made by a solid state electronic circuit which produces a linear temperature scale over a wide range of target emissivity, temperature, size, and distance.

Measurements which depend on an accurate knowledge of emissivity of a material are generally inaccurate because emissivity for any particular material is highly variable and depends upon numerous conditions such as the direction of measurement, wave length, temperature, etc.

Accordingly, a primary object of this invention is the provision of means to minimize the effects of target emissivity in temperature measurement so that there need normally be no target emissivity correction.

Another object of this invention is the provision of means giving an input reading which is intrinsically linear in target temperature over a wide temperature range.

A further object of this invention is the provision of an exclusively electronic ratio technique for rapid compensation for changes in the target's radiated power (changes in target temperature, emissivity, and distance from the measurement device); changes in ambient temperature; and changes in gain and zeroing of the measurement circuit.

An additional object of this invention is the provision of means for fast warm-up, fast response time to the target moving in and out of the field of view, and fast response time to target temperature changes.

A still further object of this invention is the provision of an all silicon solid state circuitry for obviating the need for electromechanical elements and which circuitry is extremely reliable, rugged, and inexpensive.

It is also an object of this invention to provide means that can be utilized for measuring color quality in dyeing processes, paint, etc. (the invention can be used for all three basic colors by utilizing two of the inventions) as well as for temperature measurement.

BRIEF DESCRIPTION OF THE DRAWING

The above and other objects of this invention will become apparent to those skilled in the art after a consideration of a detailed description of preferred embodiments of this invention taken together with the accompanying drawing which illustrates a schematic diagram of the basic circuit.

DETAILED DESCRIPTION OF THE INVENTION

The dependence of the power radiated by a black body upon temperature and wave length is given by Planck's Radiation Law;

$$dE/d\lambda = (c_1 \lambda^{-5})/(e^{c_2/\lambda T} - 1)$$

For E in watts, $\lambda$ in cm., and T in °K,
$C_1 = 3.74 \times 10^{-12}$ watt cm$^2$
$C_2 = 1.438$ cm°K For an instrument employing a narrow pass band filter of bandwidth $\Delta$ and center wave length $\lambda$.

$$E = (c_1 \lambda^{-5} \Delta)/(e^{c_2/\lambda T} - 1)$$

For most applications, the temperature range and wave lengths employed enable the following approximation to be valid to better than 0.1 percent:

$$E = c_1 \lambda^{-5} \Delta \, e^{-c_2/\lambda T}$$

Radiation from a non-black ("gray") body at any given wave length can be expressed as a fraction, $e$, of the radiation from a black body at that wave length. This fraction, $e$, is called the emissivity and it is a function of temperature, wave length, material, surface preparation, and angle of emission from the surface. Thus:

$$E = e C_1 \lambda^{-5} \Delta e^{-c_2/\lambda T}$$

where $$e = e(T, \lambda, \text{etc.})$$

The ratio of energy emitted by a target at two different wave lengths retains temperature information while minimizing dependence on emissivity. Specifically, only the departure from unity of the ratio of target emissivity at the two wave lengths employed influences the measurement.

The ratio of energy emitted in two spectral bands $\lambda_1$ and $\lambda_2$ (of widths $\Delta_1$ and $\Delta_2$) is given by $$R_{1,2} = \frac{E(\lambda_1)}{E(\lambda_2)} = \frac{\Delta_1 \lambda_2^5}{\Delta_2 \lambda_1^5} e^{c_2 \frac{1}{T}[(\lambda_1 - \lambda_2)/(\lambda_1 \lambda_2)]}$$

$R_{1,2}$ will have a linear dependence on T for temperatures near that temperature which satisfies the relationship:

$$(\delta^2 R_{1,2})/(\delta T^2) = 0 \quad \text{Call this temperature } T_o. \text{ This relationship for } T_o \text{ is:}$$

$$T_o = (1/2) C_2 (\lambda_2 - \lambda_1)/(\lambda_2 \cdot \lambda_1)$$

Note that $\lambda_2$ must be bigger than $\lambda_1$. Thus, for T near $T_o$, $$R_{1,2} = \frac{\Delta_1 \lambda_2^5}{\Delta_2 \lambda_1^5} e^{-2 \frac{T_o}{T}} \approx \frac{\Delta_1 \lambda_2^5}{\Delta_2 \lambda_1^5} e^{-2} [2(T - T_o) + 1]$$

With $T_o = 1380°K = 2025°F$, a range of 1400°F to 3400°F can be covered by this invention with a maximum departure from linearity of approximately ± 1 percent of the 2000°F span. Since the non-linearity is due to the above equation for $R_{1,2}$ and not to the details of the circuitry, conventional correction techniques can be engineered into the measurement circuit to render arbitrary improvement with minimal calibration adjustment.

It should be noted that the 2000°F span under consideration involves a change in ratio of about 4 to 1 but a change in light intensity of about $10^3$ to 1. Furthermore, emissivity may change by 10 to 1. Thus, the cells and circuit employed must operate linearly over at least four orders of magnitude of current.

An an actual example, this invention employs wave lengths at 8000 Angstroms and 9450 Angstroms. For these wave lengths, large surface area, light sensitive, silicon diodes are employed as light-sensitive cells.

The cells are illuminated by an optical system comprising a lens, a glass light pipe and a pair of filters, one for each cell. The lens images the target on the front end of the glass light pipe. The light pipe's front end is rough ground to diffuse the light. The light pipe is sufficiently long so as to ensure that the light from any part of the target (i.e. from any point on the front surface of the light pipe) is uniformly distributed over the entire rear surface of the light pipe. This feature ensures that the measurement corresponds to the average temperature of that part of the target under measurement. The lens and the light pipe are of materials which have uniform and negligible absorption over the band of wave lengths used. The filters are preferably interference filters of 12 percent bandwith at half maximum points.

The light-sensitive cells produce a photocurrent linear in relation to incident light intensity over at least six orders of magnitude. Thus, an electronically measured ratio of cell output currents may be made without resorting to optical attenuations to make measurements at a fixed light intensity. To further simplify the circuitry, the cells are connected to the virtual ground of an operational amplifier for the elimination of effects due to leakage currents and variable bias voltage across the diodes.

In some applications, the photocurrents are sufficiently small as to require a chopper stabilized amplifier. It is then most satisfactory for the two cells to time share the same amplifier.

Whenever a cell is not connected to the amplifier input, the cell must be shunted to ground to prevent variable charge buildup in cell capacitance during its off cycle. Leakage effects otherwise contribute to non-linearity. The cells have high resistance to reduce amplifier noise and to minimize effects of non-zero amplifier input resistance and switch resistance.

The electronic ratio technique is based on a linear amplifier with an automatic gain control circuit operated from the output of the reference cell or $\lambda_2$ channel. The reference cell or $\lambda_2$ channel and the measurement cell or $\lambda_1$ channel time share a common amplifier chain. The circuitry employed is schematically illustrated in the figure.

The amplifier chain is comprised of two amplifiers A1 and A2 which are used to provide adequate gain and AGC range. Amplifier A1 has an AGC 1 or servo element in its gain control resistor network, and amplifier A2 has an AGC 2 or servo element in its gain control resistor network. A switch control operates ganged switches S1 and S2 so that they are respectively either connected to the reference cell and an amplifier A3 or to the measuring cell and an amplifier A4 at any specific time. It should be noted that nulling elements of the chopping circuitry are not shown in the drawing. These nulling elements are used because of the low voltages and currents being measured.

Amplifier A3 is a comparator which controls elements AGC 1 and AGC 2 to produce that gain which gives +2 volts, as an example, at the output of amplifier A2. A capacitor C3 across amplifier A3 stores the AGC voltage during the measurement cycle, and a resistor R3 damps the AGC control loop response and permits noise to be integrated out. When the measurement cell is connected to the input of amplifier A1, the output circuit of amplifier A2 is connected to the input of amplifier A4 where a capacitor C4 provides the storage and, together with a resistor R4, provides noise filtration. Amplifier A4 is connected to the output terminal with an output zero and gain adjustment. A properly calibrated meter at the output indicates the correct measured temperature based on the ratio of energy emitted at the reference and measured wave lengths.

It should be noted that the reference and measurement cells are grounded when not connected to amplifier A1. Switches are also provided for the nulling of amplifiers A1 and A2. The input of amplifiers A1 and A2 must be at voltage and current zero. The inventive scheme employed is to design amplifiers A1 and A2 with negligible bias currents and to provide offset voltage nulling loops for both amplifiers A1 and A2. The chopping scheme thus has four major phases:

1. open circuit input to amplifier A1, short both cells to ground, short output of amplifier A1, and null the offset voltage of amplifier A2;
2. open circuit input to amplifier A1, short both cells to ground, and null the offset voltage of amplifier A1;
3. connect the reference cell (shorting the measurement cell to ground) and set the AGC to produce, as an example, +2 volts output; and
4. connect the measurement cell (shorting the reference cell to ground) and update the output.

The above adjustments do not have significant interaction thus enabling fast response time without oscillations or multiple repetitions of the four phases described above. At the low signal levels encountered, switching transients are significant. Hence, each major phase is divided into two parts. The first is the circuit settling period, and the second is the control or measurement period.

All switches are MOS FET's to minimize leakage and noise and to permit fast chopping rates if desired. The instrument is normally operated with switching synchronized to the power line to remove line voltage feedthrough effects (hum), and to give a well defined average temperature reading for targets heated from the power line.

Amplifier A1, AGC 1, and all switches associated therewith are designed with components which have leakage currents totaling less than one percent of full scale at highest gain. The switch on resistance and the effective input resistance of amplifier A1 are chosen to be less than one percent of the cell internal resistances. The input circuit is shielded, guarded, and kept sufficiently clean to be compatible with the low signal levels.

MOS FET's having linear channel resistances over the entire range of voltages impressed thereacross are used for the AGC elements because of their fast response time and the fact that they provide a usable range of resistances of over 10,000 to 1.

Diodes (not shown) are used to shunt the damping resistors in the control and measurement circuits to considerably increase the speed of response to large changes (target out — target in field of view). Because of this improvement in response time, larger resistors may be used to minimize jitter due to noise.

While preferred embodiments of this invention have been illustrated and described, it should be understood by those skilled in the art that many changes and modifications may be resorted to without departing from the spirit and scope of this invention.

What is claimed is:

1. An instrument for remotely measuring the unknown temperature of a target, said instrument comprising:
   optical means for receiving continuous light energy being emitted by said target over an unbroken range of frequencies, and for separating said light energy into two predetermined wave lengths;
   first and second means operatively located for receiving said light energy and for substantially linearly converting said light energy into electrical energy;
   first amplifier means including AGC means for controlling the output thereof;
   second amplifier means including a feedback loop and an AGC means for controlling the output thereof;
   third amplifier means including an energy reference and feedback circuit for generating an output signal to control the AGC means of said first and second amplifier means;
   fourth amplifier means including an output zero and gain adjustment circuit;
   two position switching means operatively coupling said first and second amplifier means in circuit selectively with said first means and said third amplifier means to generate the AGC control signal and said second means and said fourth amplifier means to generate by said sequence of switching an output signal indicative of the temperature of the unknown target based on the ratio of energy emitted at said two predetermined wave lengths;
   means coupling the output of said third amplifier means with the AGC means of said first and second amplifier means; and
   means receiving the output from said fourth amplifier means for indicating the said temperature of the unknown target.

2. An instrument as in claim 1 wherein said first and second converting means each includes a large surface area, light sensitive silicon diode.

* * * * *